(12) United States Patent
Kim et al.

(10) Patent No.: US 12,112,513 B2
(45) Date of Patent: Oct. 8, 2024

(54) SYSTEM AND METHOD FOR IDENTIFYING NON-STANDARD USER INTERFACE OBJECT

(71) Applicant: SAMSUNG SDS CO., LTD., Seoul (KR)

(72) Inventors: Hyo Young Kim, Seoul (KR); Koo Hyun Park, Seoul (KR); Keun Taek Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 415 days.

(21) Appl. No.: 17/511,711

(22) Filed: Oct. 27, 2021

(65) Prior Publication Data

US 2022/0129691 A1   Apr. 28, 2022

(30) Foreign Application Priority Data

Oct. 27, 2020   (KR) .................. 10-2020-0140598

(51) Int. Cl.
*G06V 10/20*   (2022.01)
*G06F 16/22*   (2019.01)
(Continued)

(52) U.S. Cl.
CPC ........ *G06V 10/255* (2022.01); *G06F 16/2282* (2019.01); *G06F 18/22* (2023.01);
(Continued)

(58) Field of Classification Search
CPC .... G06V 10/255; G06V 10/751; G06V 10/25; G06V 10/761; G06V 10/40;
(Continued)

(56) References Cited

U.S. PATENT DOCUMENTS 7,913,292 B2 *  3/2011  Hartrell ................... G06F 21/31
                                                                    726/16
11,861,665 B2 *  1/2024  Pamuru .............. G06Q 30/0276
(Continued)

FOREIGN PATENT DOCUMENTS

CN          109919164 A      6/2019

OTHER PUBLICATIONS

European Search Report for EP21205072.8 issued on Apr. 14, 2022 from European patent office in a counterpart European patent application.

(Continued)

*Primary Examiner* — John B Strege
(74) *Attorney, Agent, or Firm* — NSIP Law

(57) ABSTRACT

A non-standard user interface object identification system includes an object candidate extractior that extracts one or more objects from an image, a first similarity analyzer that determines object type candidates of the one or more objects in accordance with similarities between the one or more objects and a standard user interface (UI) element, a second similarity analyzer that selects object type-specific weight values in accordance with layout characteristics of the one or more objects and determines object types of the one or more objects using the object type candidates and the object type-specific weight values, and an object identifier that receives type and characteristic information of a search target object and identifies the search target object in accordance with characteristic information and the object types of the one or more objects.

14 Claims, 15 Drawing Sheets

(51) Int. Cl.
  *G06F 18/22* (2023.01)
  *G06V 10/75* (2022.01)
  *G06V 30/10* (2022.01)
  *G06V 30/19* (2022.01)

(52) U.S. Cl.
  CPC ........ *G06V 10/751* (2022.01); *G06V 30/1912* (2022.01); *G06V 30/19127* (2022.01); *G06V 30/10* (2022.01)

(58) Field of Classification Search
  CPC ......... G06V 30/1912; G06V 30/19127; G06V 30/10; G06V 30/414; G06V 2201/02; G06F 16/2282; G06F 18/22
  See application file for complete search history.

(56) References Cited

U.S. PATENT DOCUMENTS

| | | |
|---|---|---|
| 2013/0042200 A1 | 2/2013 | Armitage |
| 2018/0335849 A1 | 11/2018 | Liddell et al. |
| 2020/0073686 A1* | 3/2020 | Hanke ............... G06F 18/22 |
| 2020/0310952 A1* | 10/2020 | Shani ............... G06F 16/00 |
| 2021/0182184 A1* | 6/2021 | Shang ............ G06F 11/3688 |
| 2021/0201026 A1* | 7/2021 | Lin ..................... G06T 1/00 |

OTHER PUBLICATIONS

Tom Yeh et al., "Sikuli: Using GUI Screenshots for Search and Automation", Proceedings of the 22nd annual acm symposium on user interface software and technology: Victoria, British Columbia, Oct. 4-7, 2009, ACM, New York, NY, Oct. 4, 2009, pp. 183-192, XP058124772.

Zettlemoyer Lukes. et al., "A Visual Medium for Programmatic Control of Interactive Applications", ACM CHI 1999, May 15-20, 1999, Pittsburgh, PA, vol. 99, pp. 199-206, XP055907892.

* cited by examiner

| OBJECT ID | LEFT | TOP | WIDTH | HEIGHT |
|---|---|---|---|---|
| Obj_001 | 30 | 50 | 150 | 50 |
| Obj_002 | 30 | 100 | 60 | 30 |
| Obj_003 | 35 | 150 | 60 | 30 |
| . | . | . | . | . |
| . | . | . | . | . |
| Obj_100 | 35 | 5 | 60 | 0 |

FIG. 6

| OBJECT TYPE | TEXT | BORDER | UNDERLINE | CHECK | RADIO | COMBO |
|---|---|---|---|---|---|---|
| NORMAL BUTTON | 30 | 50 | 5 | 5 | 5 | 5 |
| NORMAL TEXT | 70 | 10 | 20 | 0 | 0 | 0 |
| HYPERLINK | 35 | 5 | 60 | 0 | 0 | 0 |
| TEXT EDITCONTROL | 20 | 55 | 5 | 0 | 0 | 20 |
| CHECK BOX | 10 | 30 | 0 | 60 | 0 | 0 |
| RADIO BUTTON | 20 | 20 | 0 | 0 | 60 | 0 |
| COMBO BOX | 10 | 30 | 0 | 5 | 0 | 60 |
| IMAGE LINK | 0 | 30 | 60 | 5 | 5 | 0 |
| NORMAL IMAGE | 0 | 20 | 20 | 20 | 20 | 20 |

| OBJECT TYPE | SUM OF SIMILARITIES | WHETHER OR NOT TO BE FINALLY INCLUDED |
|---|---|---|
| NORMAL BUTTON | 80 | O |
| NORMAL TEXT | 80 | O |
| HYPERLINK | 40 | X |
| TEXT EDIT CONTROL | 75 | O |
| CHECK BOX | 40 | X |
| RADIO BUTTON | 40 | X |
| COMBO BOX | 40 | X |
| IMAGE LINK | 30 | X |
| NORMAL IMAGE | 40 | X |

FIG. 9

OBJECT LIST

| OBJECT ID |
|---|
| Obj_001 |
| Obj_002 |
| Obj_003 |
| . |
| . |
| Obj_100 |

OBJECT TYPE CANDIDATE LIST

| OBJECT ID | OBJECT TYPE | SIMILARITY |
|---|---|---|
| Obj_002 | NORMAL BUTTON | 80 |
| Obj_002 | NORMAL TEXT | 80 |
| Obj_002 | TEXT EDIT CONTROL | 75 |

FIG. 15

| OBJECT ID | OBJECT POSITION | OBJECT TYPE | LEFT | TOP | WIDTH | HEIGHT |
|---|---|---|---|---|---|---|
| Obj_001 | TOP | · | 30 | 50 | 150 | 50 |
| Obj_002 | TOP | NORMAL BUTTON | 105 | 50 | 60 | 30 |
| Obj_003 | TOP | · | 200 | 50 | 60 | 30 |
| · | · | · | · | · | · | · |
| · | · | · | · | · | · | · |
| Obj_100 | LEFT | · | 35 | 5 | 60 | 0 |

SYSTEM AND METHOD FOR IDENTIFYING NON-STANDARD USER INTERFACE OBJECT

CROSS REFERENCE TO RELATED APPLICATION

This application claims priority from Korean Patent Application No. 10-2020-0140598, filed on Oct. 27, 2020, which is hereby incorporated by reference for all purposes as if fully set forth herein.

BACKGROUND

1. Field

Embodiments of the present disclosure relate to a technology for identifying a non-standard object on a user interface.

2. Description

In order to process simple repetitive tasks more productively and effectively, cases of introducing robotic process automation (RPA) are increasing. RPA is a technology allowing a software robot to imitate and perform a simple repetitive task that a user has previously performed on a personal computer (PC). In the RPA field, a robot performs an automated task on the basis of a user interface (UI) screen in a human like manner, without a change of a previously constructed legacy system. Thus, during automation, the UI characteristics of a target system have a significant effect on reliable performance of automation.

Automation may be reliably performed on a standard UI, since each element of the standard UI is identified as a single object in a number of cases. However, in a number of cases, and depending on the performance environment, automation may not be reliably performed on a non-standard UI (e.g., Flash or Xplatform), since each element of the non-standard UI is not identified as an individual object. Thus, there is demand for a technology for effectively recognizing non-standard UI objects.

The information disclosed in the Background section is only provided for a better understanding of the background and should not be taken as an acknowledgment or any form of suggestion that this information forms prior art that would already be known to a person having ordinary skill in the art.

SUMMARY

Embodiments of the present disclosure are intended to provide a technical means for identifying and classifying respective elements of a non-standard user interface (UI) as individual objects.

According to an exemplary embodiment, a non-standard user interface object identification system may include: an object candidate extractior extracting one or more objects from an image; a first similarity analyzer determining object type candidates of the one or more objects in accordance with similarities between the one or more objects and a standard user interface (UI) element; a second similarity analyzer selecting object type-specific weight values in accordance with layout characteristics of the one or more objects and determining object types of the one or more objects using the object type candidates and the object type-specific weight values; and an object identifier receiving type and characteristic information of a search target object and identifying the search target object in accordance with characteristic information and the object types of the one or more objects.

The object candidate extractior may extract bounding rectangles of the one or more objects from the image and generate an object list including information regarding the bounding rectangles.

The object list may include position information and size information of the objects.

The first similarity analyzer may calculate standard UI characteristic scores of the objects and calculate similarities of the objects to standard UI types using the standard UI characteristic scores and predetermined characteristic values of the standard UI types.

The first similarity analyzer may determine a standard UI type among the standard UI types, the similarity of which is equal to or greater than a threshold valve, to be an object type candidate of a corresponding object among the one or more objects.

The second similarity analyzer may generate one or more groups from the one or more objects in accordance with similarities of position information of the one or more objects and select one among a plurality of object type-specific weight values in consideration of positions of the one or more groups in the image.

The second similarity analyzer may determine the object types of the one or more objects by applying the object type-specific weight values to the similarities of the object type candidates.

The object identifier may first identify at least one object having the same object type as the search target object, among the one or more objects, and identify the search target object by comparing characteristic information of each of the first-identified at least one object with the characteristic information of the search target object.

According to another exemplary embodiment, a non-standard user interface object identification method may include: extracting one or more objects from an image; determining object type candidates of the one or more objects in accordance with similarities between the one or more objects and a standard UI element; selecting object type-specific weight values in accordance with layout characteristics of the one or more objects and determining object types of the one or more objects using the object type candidates and the object type-specific weight values; and receiving type and characteristic information of a search target object and identifying the search target object in accordance with characteristic information and the object types of the one or more objects.

The extraction of the one or more objects may include extracting bounding rectangles of the one or more objects from the image and generating an object list including information regarding the bounding rectangles.

The determination of the object type candidates may include position information and size information of the objects.

The determination of the object type candidates may include calculating standard UI characteristic scores of the objects and calculating similarities of the objects to standard UI types using the standard UI characteristic scores and predetermined characteristic values of the standard UI types.

The determination of the object type candidates may determine a standard UI type among the standard UI types, the similarity of which is equal to or greater than a threshold valve, to be an object type candidate of a corresponding object among the one or more objects.

The determination of the object types may include generating one or more groups from the one or more objects in accordance with similarities of position information of the one or more objects and selecting one among a plurality of object type-specific weight values in consideration of positions of the one or more groups in the image.

The determination of the object types may determine the object types of the one or more objects by applying the object type-specific weight values to the similarities of the object type candidates.

The identification of the search target object may include first identifying at least one object having the same object type as the search target object, among the one or more objects, and identifying the search target object by comparing characteristic information of each of the first-identified at least one object with the characteristic information of the search target object.

According to embodiments of the present disclosure, it is possible to identify and classify respective elements of a non-standard UI, thereby effectively performing automation on the non-standard UI. In addition, since embodiments of the present disclosure detect an object on the basis of the type and characteristic of the object, the embodiments are flexible to changes in the environment in which automation is performed and can improve the accuracy of detection and classification of the object.

BRIEF DESCRIPTION OF THE DRAWINGS

The above and other objectives, features, and advantages of the present disclosure will be more clearly understood from the following detailed description, taken in conjunction with the accompanying drawings, in which:

FIG. 6 is a table illustrating the standard UI object characteristic model according to an embodiment;

FIGS. 7 to 9 are example diagrams illustrating a standard UI characteristic score extracting process by the first similarity analyzer according to an embodiment;

FIG. 15 is an example diagram illustrating an object list to which the position and the object type of each of the objects are added;

DETAILED DESCRIPTION

Hereinafter, specific embodiments will be described with reference to the accompanying drawings. The following detailed description is provided to assist in a comprehensive understanding of at least one of a method, a device, and a system to be described herein. However, the detailed description is merely exemplary, and the present disclosure is not limited thereto.

In the description of embodiments of the present disclosure, a detailed description of known technologies related to the present disclosure will be omitted in the situation in which the subject matter of the present disclosure may be rendered rather unclear thereby. Terms to be used hereinafter will be defined in consideration of functions thereof in embodiments of the present disclosure, but may vary depending on the intentions of users or operators, as well as practices. Therefore, the terms shall be defined on the basis of the descriptions throughout the specification. The terms used in the detailed description shall be interpreted as being illustrative, while not being limitative, of embodiments. Unless clearly used otherwise, a singular form includes a plural meaning. It shall be understood that expressions such as "comprise," "include," and "have" used herein are for indicating certain features, numbers, steps, operations, elements, a part or combinations thereof and are not to be interpreted as excluding the presence or possibility of one or more features, numbers, steps, operations, elements, a part or combinations thereof other than the above.

Figure 1:
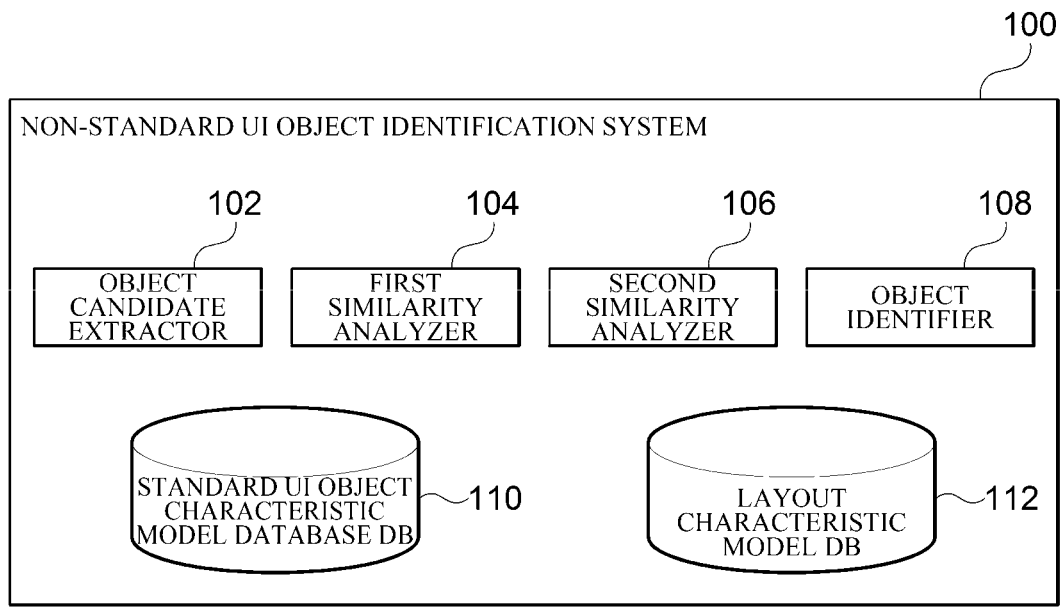
FIG. 1 is a block diagram illustrating a non-standard UI object identification system according to an embodiment.

FIG. 1 is a block diagram illustrating a non-standard user interface (UI) object identification system 100 according to an embodiment. As illustrated in FIG. 1, the non-standard UI object identification system 100 according to an embodiment includes an object candidate extractior 102, a first similarity analyzer 104, a second similarity analyzer 106, and an object identifier 108.

The object candidate extractior 102 extracts one or more objects from a target screen image. In embodiments of the present disclosure, the target screen image may be a screen image including one or more UIs and provided to a user through a display means of a computing device. The one or more user interfaces (UIs) may include one or more standard UIs and one or more non-standard UIs. The "standard UI" indicates a screen interface element, such as a button, a hyperlink, a text edit control, a check box, a radio button, a combo box image link, and an image, used in common by a plurality of users.

In an embodiment, the standard UI may be defined by organizations or groups related to standards, such as web standards. In another embodiment, the standard UI may be a UI generally used as a substantially standard UI in an applicable technical field, although not defined by a standard organization. That is, in embodiments of the present disclosure, the standard UI should be interpreted as having a meaning encompassing UI elements typically shared and used by specific units (e.g., within a single enterprise, a specific organization, or a specific technological field) in formal and informal terms.

In addition, as opposed to the standard UI, conceptually, although the non-standard UI performs the same or similar functions to the standard UI, the characteristics thereof may be different from those of the standard UI. For example, when a button or the like is realized using Flash, Xplatform, or the like, the shape, the operating method, or the like of the button of the standard UI may be different from that of a typical button. In the standard UI, a corresponding UI element may be easily identified from the screen or a program code or the like of the screen. However, the diversity of the shape of the non-standard UI is significantly greater than that of the standard UI. Due to the characteristics of the non-standard UI, it may also be impossible or extremely difficult to use a single identification method.

In an embodiment, the object candidate extractior 102 may extract a bounding rectangle of each of one or more objects from the target screen image and generate an object list including information regarding the bounding rectangle. Here, the object list may include position information (e.g., top and left coordinates) and size information (e.g., weight and height) of each of the objects.

The first similarity analyzer 104 determines an object type candidate of each of the one or more objects, on the basis of the similarity between the one or more objects and standard UI types.

In an embodiment, the first similarity analyzer 104 may calculate specific standard UI characteristic scores of the objects and may calculate the similarities of the objects to the standard UI types using the characteristic scores and predetermined standard UI type-characteristic values. The first similarity analyzer 104 may determine a standard UI type, the similarity of which is equal to or greater than a threshold value, as an object type candidate of the corresponding object.

The second similarity analyzer 106 selects object type-specific weight values on the basis of layout characteristics of the one or more objects, and determines the object types of the one or more objects using the object type candidate and the object type-specific weight values.

In an embodiment, the second similarity analyzer 106 may generate one or more groups from the one or more objects on the basis of the similarities of the position information of the one or more objects and select one of a plurality of object type-specific weight value lists in consideration of positions of the one or more groups in the target screen image.

Afterwards, the second similarity analyzer 106 may determine the object types of the one or more objects by applying the object type-specific weight values to the similarities of the object type candidates.

The object identifier 108 receives object type and characteristic information of a search target object and identifies the search target object among the one or more objects on the basis of object characteristic information of the one or more objects and the object types of the one or more objects. In an embodiment, the object identifier 108 may first identify at least one object having the same object type as the search target object, among the one or more objects, and identify the search target object by comparing the object characteristic information of each of the first-identified at least one object with the object characteristic information of the search target object.

A standard UI object characteristic model database (DB) 110 is a database in which standard UI object characteristic models used in the first similarity analyzer 104 are stored. In addition, a layout characteristic model DB 112 is a DB in which the object type-specific weight value lists according to the layout characteristic used in the second similarity analyzer 106 are stored.

Figure 2:
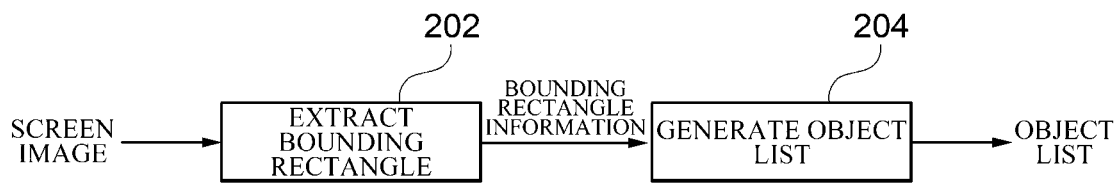
FIG. 2 is a flow diagram specifically illustrating operation of the object candidate extractior of the non-standard UI object identification system according to an embodiment.

FIG. 2 is a flow diagram specifically illustrating the operation of the object candidate extractior 102 of the non-standard UI object identification system 100 according to an embodiment. Although the method or process is illustrated as being divided into a plurality of steps in the flow diagram of FIG. 2, at least some steps thereof may be performed in different sequences, be performed in combination with other steps, be omitted, or be divided into sub-steps, or one or more steps not shown herein may be added thereto.

In step 202, the object candidate extractior 102 extracts one or more bounding rectangles from the target screen image. In an embodiment, the object candidate extractior 102 may extract the bounding rectangles as objects using an outline extraction algorithm.

In step 204, the object identifier 108 assigns the extracted bounding rectangles object IDs, respectively, and generates an object list including object IDs and information of each of the bounding rectangles.

Figures 3, 4:
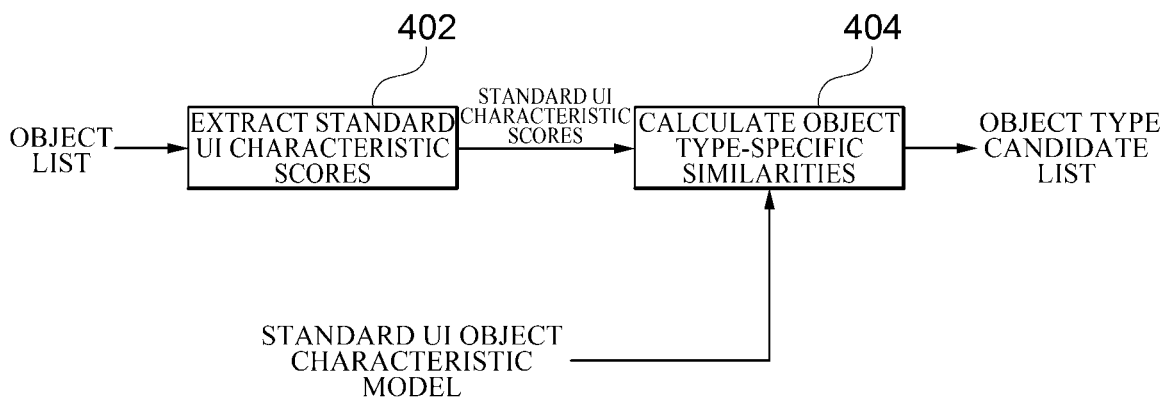
FIG. 3 is an example diagram illustrating an object list according to an embodiment.
FIG. 4 is a flow diagram specifically illustrating the operation of the first similarity analyzer of the non-standard UI object identification system according to an embodiment.

FIG. 3 is an example diagram illustrating an object list according to an embodiment. As illustrated in FIG. 3, the object list includes object IDs, such as Obj_001 and Obj_002, and information (e.g., left and top coordinates, the width, and the height) of each of the objects.

FIG. 4 is a flow diagram specifically illustrating the operation of the first similarity analyzer 104 of the non-standard UI object identification system 100 according to an embodiment.

In step 402, the first similarity analyzer 104 extracts the standard UI characteristic scores of the objects included in the object list.

Figure 5:
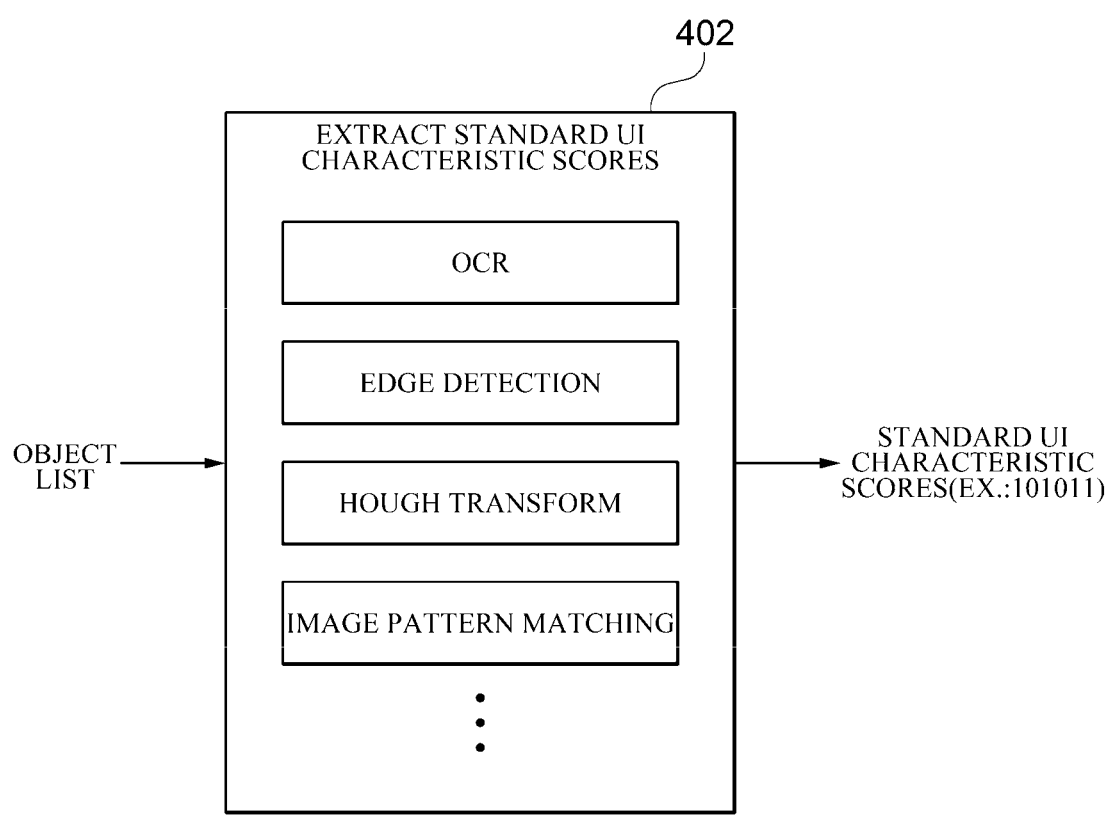
FIG. 5 is a diagram illustrating a process of extracting standard UI characteristic scores by the first similarity analyzer according to an embodiment.

FIG. 5 is a diagram illustrating a process of extracting standard UI characteristic scores by the first similarity analyzer 104 according to an embodiment. The first similarity analyzer 104 may divide the standard UI into a plurality of characteristic elements. For example, the first similarity analyzer 104 may divide the standard UI into 6 characteristic elements as follows.

The 6 characteristic elements are Text, Border, Underline, Check Box, Radio Button, and Combo Button.

Afterwards, through characteristic analysis of the objects included in the object list, the first similarity analyzer 104 determines which one of the characteristic elements each of the objects has. In an embodiment, the first similarity analyzer 104 may perform characteristic analysis on each of the objects using a method, such as optical character recognition (OCR), edge detection, Hough transform, or image pattern matching. However, these methods are illustrative only, and embodiments of the present disclosure are not limited to a specific algorithm.

The first similarity analyzer 104 calculates standard UI characteristic scores of the objects through the characteristic analysis described above. Each of the standard UI characteristic scores may be expressed with N number of bits, and each of the bits indicates the presence of the corresponding characteristic element. For example, when the standard UI characteristic score of a specific object is "101011", this indicates that the corresponding object includes Text, Underline, Radio Button, and Combo Button among the characteristic elements and does not include Border or Check Box among the characteristic elements.

Returning to FIG. 4, in step 404, the first similarity analyzer 104 calculates the object type-specific similarities of the objects using the standard UI characteristic scores of the objects. Here, the object type-specific similarity is an indicator indicating a degree to which the corresponding object is similar to the standard UI type. In an embodiment, the first similarity analyzer 104 may calculate similarities using a predetermined standard UI object characteristic model together with the UI characteristic scores of the objects.

In embodiments of the present disclosure, the standard UI object characteristic model indicates degrees to which the standard UI objects are related to the above-described characteristic elements, respectively.

FIG. 6 is a table illustrating the standard UI object characteristic model according to an embodiment. As illustrated in FIG. 6, the standard UI object characteristic model includes standard UI type-specific characteristic values. For example, in the illustrated table, Normal Button has characteristic values of Text 30, Border 50, Underline 5, Check Box 5, Radio Button 5, Combo Button 5. Such standard UI type-specific characteristic values may be predetermined in consideration of external characteristics of the standard UI types. According to the UI characteristic scores and the standard UI type-specific characteristic values of the objects, the object type-specific similarities may be calculated as follows:

Sum of (Respective Bits of Standard UI Characteristic Scores X Corresponding Standard UI Type-Specific Characteristic Values)

For example, when the standard UI characteristic score of a specific object is 110000, the similarity between the specific object and Normal Button may be calculated as follows:

$$\text{Normal Button}=1\times30+1\times50+0\times5+0\times5+0\times5+0\times5=80$$

The first similarity analyzer 104 may calculate the standard UI type-specific similarities included in FIG. 6 of the objects included in the object list and determine one or more standard UI types, the similarity of each of which is calculated to be equal to or greater than a threshold value, to be object type candidates of the corresponding object.

Figures 7, 8:

FIGS. 7 to 9 are example diagrams illustrating a standard UI characteristic score extracting process by the first similarity analyzer 104 according to an embodiment. For example, a result obtained by calculating the standard UI characteristic score of an object, as illustrated in FIG. 7, by the first similarity analyzer 104 may be taken to be "110000." FIG. 8 illustrates a result obtained by calculating standard UI object type-specific similarities using the standard UI characteristic scores and the standard UI object characteristic model illustrated in FIG. 6.

As illustrated in FIG. 8, the standard UI types having the highest similarity to the object in FIG. 7 are Normal Button and Normal Text respectively having a similarity of 80. Then, Text Edit Control has the next highest similarity of 75. When the threshold value of the similarity is set as 70, the first similarity analyzer 104 determines Normal Button, Normal Text, and Text Edit Control to be object type candidates of the corresponding object and generates an object type candidate list including the determined object type candidates.

FIG. 9 illustrates a result of mapping an object list and an object type candidate list when the identification ID of the object illustrated in FIG. 7 is Obj_002. In this manner, the first similarity analyzer 104 may generate an object list-specific object type candidate list included in the object list.

Figure 10:
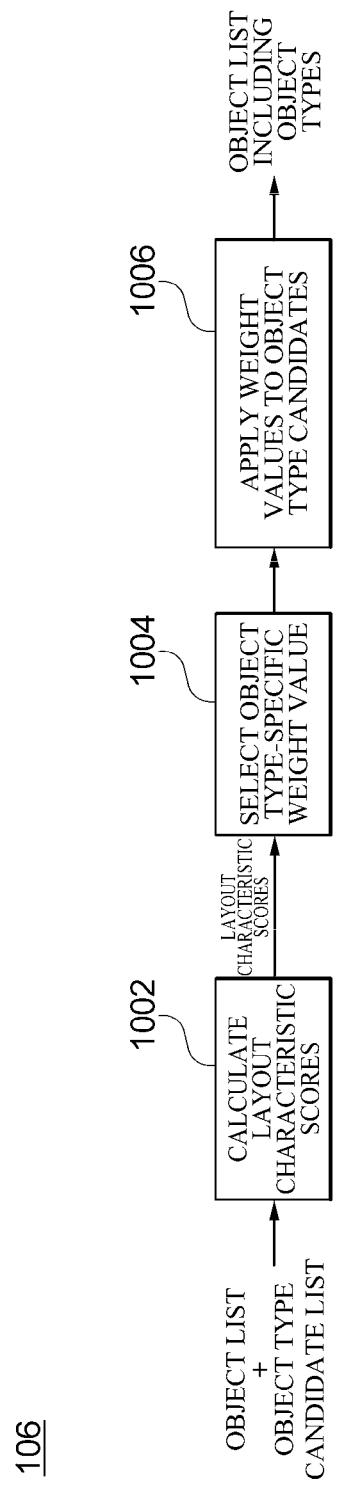
FIG. 10 is a flow diagram specifically illustrating the operation of the second similarity analyzer of the non-standard UI object identification system according to an embodiment.

FIG. 10 is a flow diagram specifically illustrating the operation of the second similarity analyzer 106 of the non-standard UI object identification system 100 according to an embodiment. The second similarity analyzer 106 is configured to derive an object-specific final object type by applying a weight to an object type on the basis of the characteristic in which an object type present in a specific position of the screen is limited according to the characteristic of the screen layout.

In step 1002, the second similarity analyzer 106 calculates layout characteristic scores from the one or more objects extracted from the target screen image.

Figure 11:
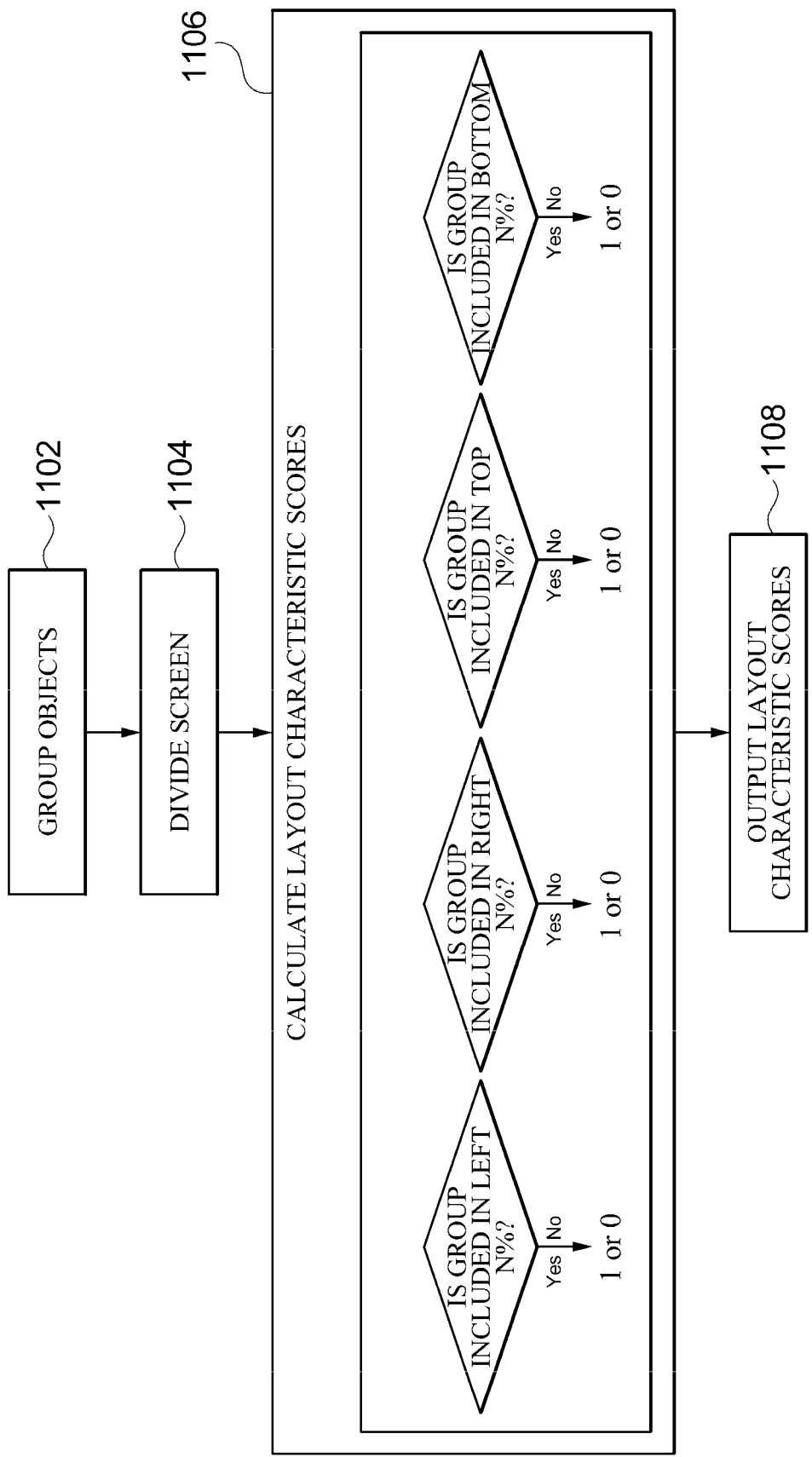
FIG. 11 is a flow diagram illustrating a layout characteristic score calculation process of the second similarity analyzer according to an embodiment.

FIG. 11 is a flow diagram illustrating a layout characteristic score calculation process 1002 of the second similarity analyzer 106 according to an embodiment.

In step 1102, the second similarity analyzer 106 generates one or more groups from the objects on the basis of the similarity of the position information of the objects. For example, the second similarity analyzer 106 may align the objects on the basis of left coordinates and group some of the objects having similar left coordinates. Likewise, the second similarity analyzer 106 may align the objects on the basis of top coordinates and group some of the objects having similar top coordinates.

Figure 12:
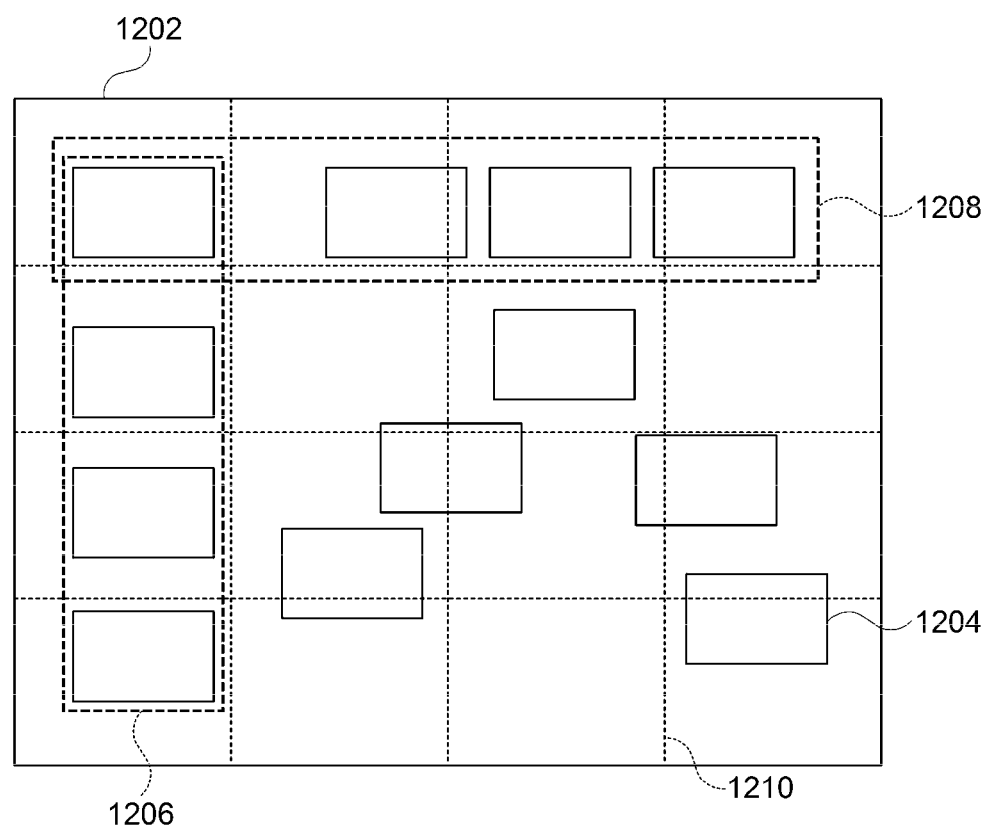
FIG. 12 illustrates an example in which objects are grouped by the second similarity analyzer.

FIG. 12 illustrates an example in which objects are grouped by the second similarity analyzer 106. In FIG. 12, 1202 indicates a target screen image, and 1204 indicates objects identified from the target screen image 1202. As illustrated in FIG. 12, it may be appreciated that two groups including group 1 1206 and group 2 1208 are formed depending on the positions of the objects 1204 in the target screen image 1202.

In step 1104, the second similarity analyzer 106 divides the target screen image 1202 into a plurality of sub-areas. For example, the second similarity analyzer 106 may equally divide the target screen image 1202 into 16 sub-areas, but embodiments of the present disclosure are not limited to a specific number. In FIG. 12, 1206 indicates borders when the target screen image is equally divided into 16 sub-areas.

In step 1106, the second similarity analyzer 106 calculates layout characteristic scores on the basis of the divided sub-areas and the groups. According to an embodiment, the layout characteristic scores may be calculated on the basis of the positions of the groups in the target screen image 1202. For example, the second similarity analyzer 106 may calculate the layout characteristic scores using whether or not each of the groups is included in N % on the basis of the left, right, top, or bottom of the target screen image 1202. When the target screen image 1202 is equally divided into 16 sub-areas, N may be 25.

According to an embodiment, the layout characteristic score may be expressed as M number of bits, and each bit indicates whether or not a group is present in a corresponding position.

For example, as illustrated in FIG. 11, it will be taken that a layout characteristic score is determined depending on whether the group is included in the left N % (1 or 0), in the right N % (1 or 0), in the top N % (1 or 0), or in the bottom N % (1 or 0). In this case, as illustrated in FIG. 12, when the group 1 1206 is taken to be located to the left of the target screen image 1202 and the group 2 1208 is taken to be located on top of the target screen image 1202, the layout characteristic score is "1010."

Returning to FIG. 10, in step 1004, the second similarity analyzer 106 selects an object type-specific weight value on the basis of the calculated layout characteristic score. In embodiments of the present disclosure, the second similarity analyzer 106 may store and manage a plurality of object type-specific weight value lists according to the layout characteristic. The second similarity analyzer 106 may select one among the plurality of object type-specific weight value lists using the generated layout characteristic score of each group according to the position in the target screen image.

Figure 13:
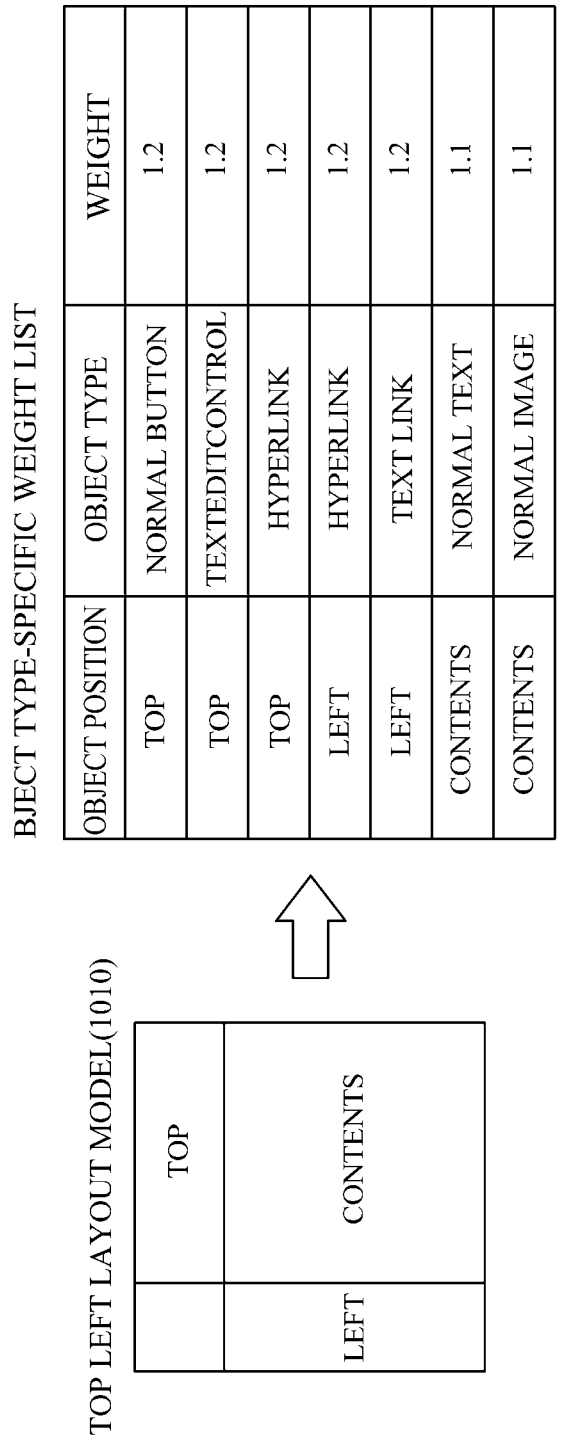
FIG. 13 is an example diagram illustrating an object type-specific weight value list when the layout characteristic score is 1010.

FIG. 13 is an example diagram illustrating an object type-specific weight value list when the layout characteristic score is 1010. In the illustrated list, the target screen image is divided into a left area, a top area, and a contents area, and the object type-specific weight value is assigned differently according to the area.

In step 1006, the second similarity analyzer 106 determines the object type of each object by applying the selected object type-specific weight value to the similarity of each of the object type candidates.

Figure 14:
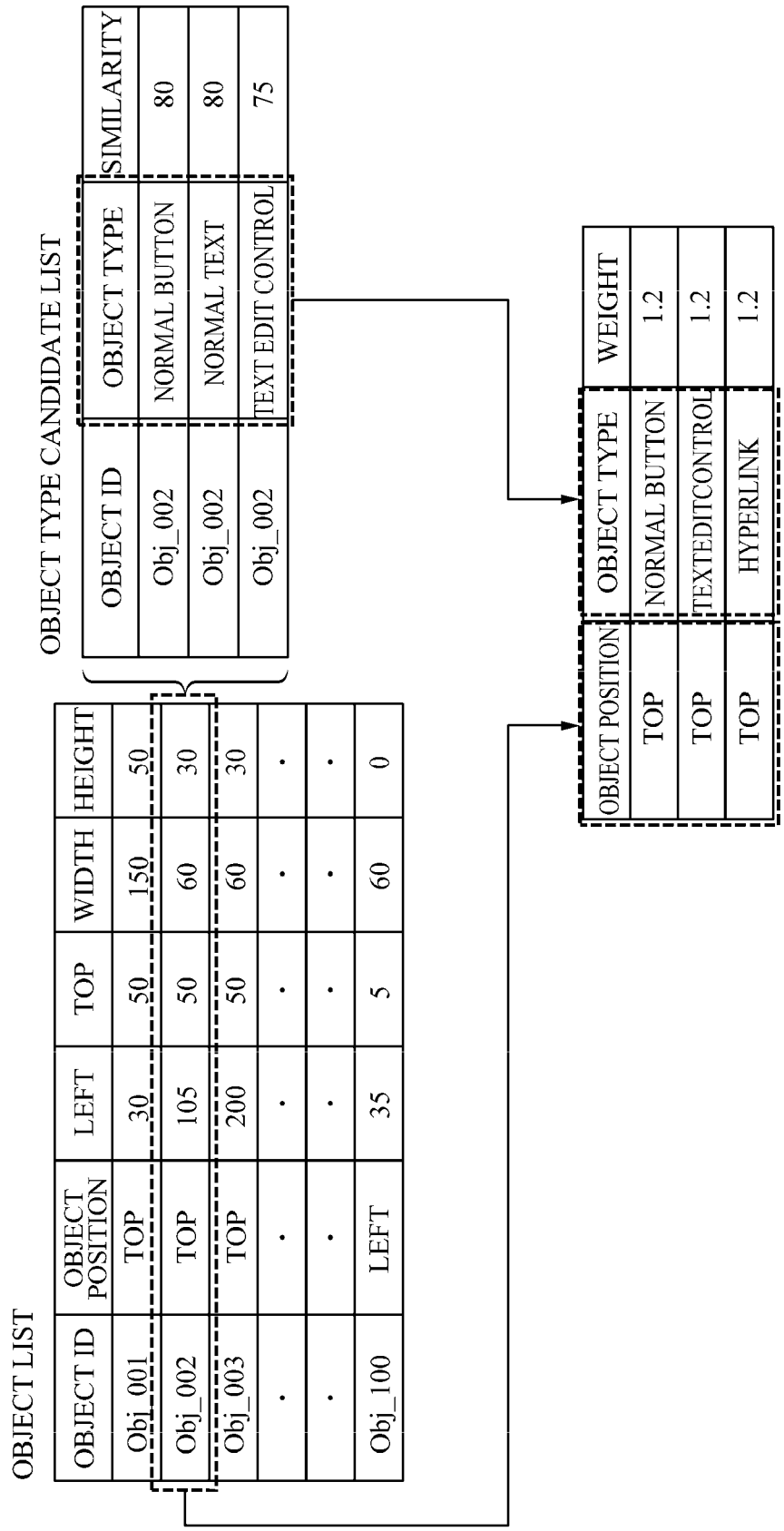
FIG. 14 illustrates an example in which weights are applied to an object-specific object type candidate list.

FIG. 14 illustrates an example in which weights are applied to an object-specific object type candidate list. As illustrated in FIG. 14, the second similarity analyzer 106 sets a weight to each of the object type candidates by reference to the position of each of the objects included in the object list.

For example, when the position of the object Obj_002 is top, the weights of Normal Button and Text Edit Control among the object type candidates are respectively determined to be 1.2 by referring to the list illustrated in FIG. 13. No additional weight is applied to Normal Text.

Afterwards, the second similarity analyzer 106 applies the set weight to the similarity as follows:

Normal Button=80(similarity)×1.2(weight)=96

Normal Text=80(No weight)

Text Edit Control=75(similarity)×1.2(weight)=90

Although Normal Button and Text Edit Control have the same similarity before the weights are applied, the similarity of Normal Button is higher than that of Text Edit Control after the application of the weights. Thus, the second similarity analyzer 106 determines the object type of the object Obj_002 to be Normal Button. FIG. 15 is an example diagram illustrating an object list to which the position and the object type of each of the objects are added.

Figure 16:
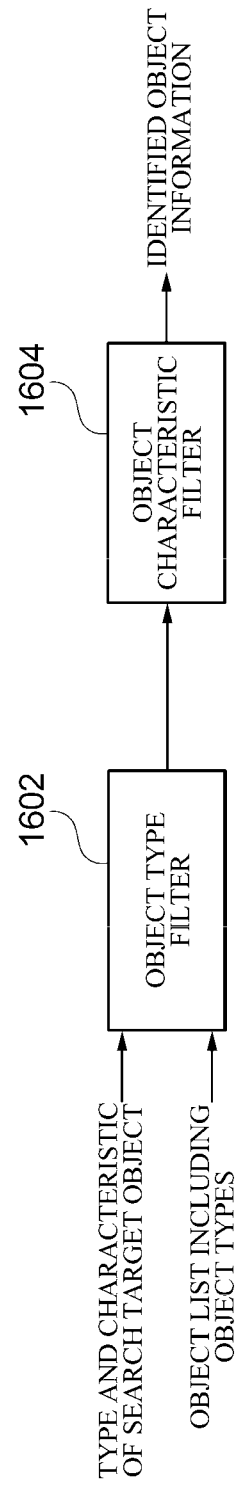
FIG. 16 is a flow diagram specifically illustrating the operation of the object identifier of the non-standard UI object identification system according to an embodiment.

FIG. 16 is a flow diagram specifically illustrating the operation of the object identifier 108 of the non-standard UI object identification system 100 according to an embodiment.

In step 1602, the object identifier 108 receives the object type and the object characteristic information of the search target object and performs first filtering on the basis of the object type. Specifically, the object identifier 108 may first identify objects having the same type as the input search target object in the object list illustrated in FIG. 15.

In step 1604, the object identifier 108 finally identifies the search target object by comparing the characteristic information of the search target object with the characteristic information of each of the first-identified objects.

For example, the type and characteristic of the input object will be taken to be as follows:
  Object characteristic: object position (top), text (mail writing)
  Object type: Normal Button In this case, the object identifier 108 first identifies objects having Normal Button type in the object list and second identifies objects, the position of each of which is top, from the first-identified objects. When the objects, the position of each of which is top, are two or more, the object identifier 108 finally selects an object including "mail writing" in the text using optical character recognition (OCR) or the like.

Figure 17:
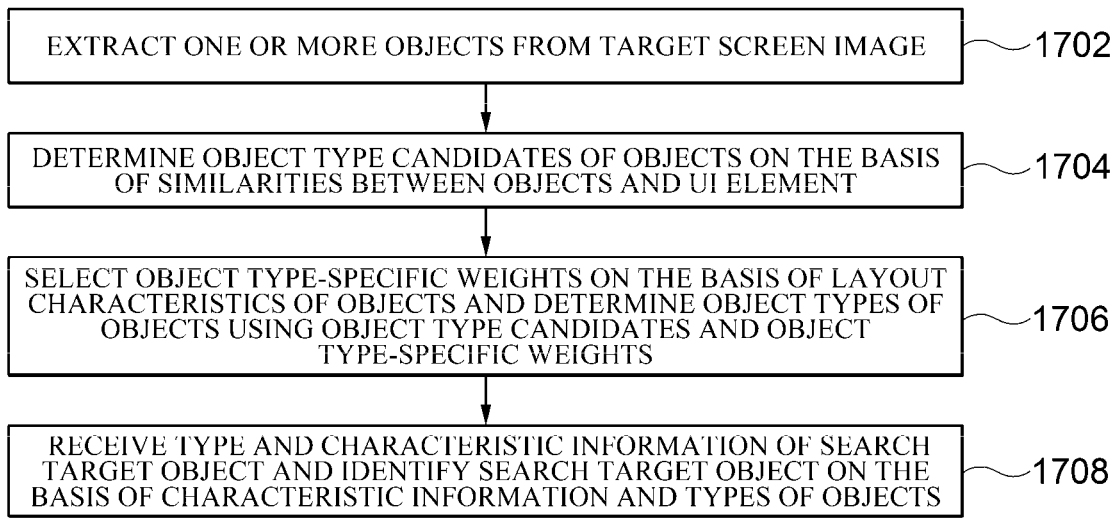
FIG. 17 is a flow diagram illustrating a non-standard UI object identifying method according to an embodiment.

FIG. 17 is a flow diagram illustrating a non-standard UI object identifying method 1700 according to an embodiment. The illustrated method 1700 may be performed by a computing device including one or more processors and a memory storing one or more programs executed by the one or more processors, for example, the above-described non-standard UI object identification system 100. Although the method or process is illustrated as being divided into a plurality of steps in the illustrated flow diagram, at least some steps thereof may be performed in different sequences, be performed in combination with other steps, be omitted, or be divided into sub-steps, or one or more steps not shown herein may be added thereto.

In step 1702, the object candidate extractior 102 extracts one or more objects from a target screen image.

In step 1704, the first similarity analyzer 104 determines object type candidates according to the one or more objects, on the basis of the similarities between the one or more objects and a standard UI element.

In step 1706, the second similarity analyzer 106 selects an object type-specific weight value on the basis of the layout characteristics of the one or more objects and determines the object types of the one or more objects using the object type candidates and the object type-specific weight values.

In step 1708, the object identifier 108 receives the type and the characteristic information of a search target object and identifies the search target object on the basis of the characteristic information of the one or more objects and the object type.

Figure 18:
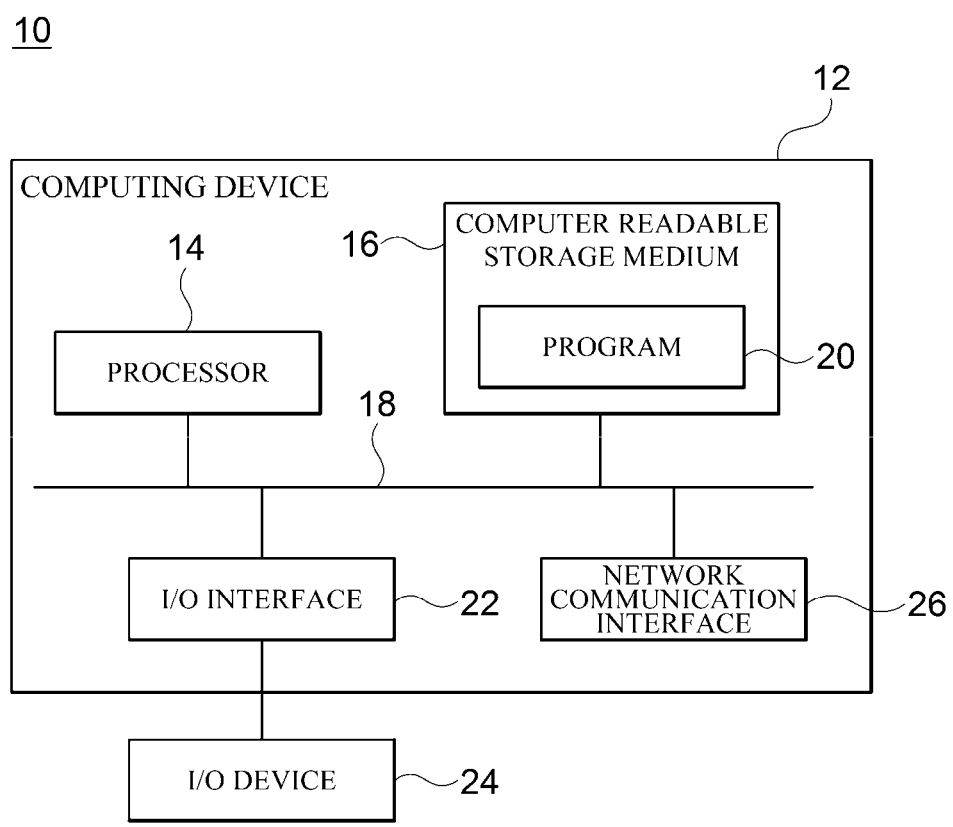
FIG. 18 is a block diagram illustrating a computing environment including a computing apparatus suitable for use in example embodiments.

FIG. 18 is a block diagram illustrating a computing environment including a computing apparatus suitable for use in example embodiments. In the illustrated embodiment, each element may have a function and capability different from those to be described below, and an additional element not described below may be included.

The illustrated computing environment 10 includes a computing device 12. According to an embodiment, the computing device 12 may be the non-standard user interface object identification system 100 described above.

The computing device 12 includes at least one processor 14, a computer readable storage medium 16, and a communication bus 18. The processor 14 may allow the computing device 12 to operate according to the example embodiments described above. For example, the processor 14 may execute one or more programs stored in the computer readable storage medium 16. The one or more programs may include one or more computer executable instructions. The computer executable instructions may be configured to allow the computing device 12 to perform the operations according to the example embodiments when executed by the processor 14.

The computer readable storage medium 16 may be configured to store computer executable instructions, program codes, program data, and/or other suitable forms of information. A program 20 stored in the computer readable storage medium 16 may include a set of instructions executable by the processor 14. According to an embodiment, the computer readable storage medium 16 may be a memory (e.g., a volatile memory such as a random access memory, a non-volatile memory, or a combination thereof), one or more magnetic disk storage devices, optical disk storage devices, flash memory devices, various other different types of storage media which can be accessed by the computing device 12 and store intended information, or a combination thereof.

The communication bus 18 may include the processor 14 and the computer readable storage medium 16, and may interconnect various components of the computing device 12 to each other.

The computing device 12 may include one or more input/output (I/O) interfaces 22 providing an interface for one or more I/O devices 24 and one or more network communication interfaces 26. The I/O interface 22 and the network communication interfaces 26 may be connected to the communication bus 18. The I/O devices 24 may be connected to other components of the computing device 12 through the I/O interfaces 22. The I/O devices 24 may include input devices, such as a pointing device (e.g., a mouse and a track pad), a keyboard, a touch input device (e.g., a touch pad and a touch screen), a voice or sound input device, various types of sensors, and/or an image capturing device, and/or output devices, such as a display device, a printer, a speaker, and/or a network card. Each of the I/O devices 24 may be one component constituting the computing device 12, may be included in the computing device 12, or may be connected to the computing device 12 as a device separate from the computing device 12.

Although the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:

1. A non-standard user interface object identification system comprising:
    an object candidate extractior extracting one or more objects from an image;
    a first similarity analyzer determining object type candidates of the one or more objects in accordance with similarities between the one or more objects and a standard user interface (UI) element;
    a second similarity analyzer selecting object type-specific weight values in accordance with layout characteristics of the one or more objects and determining object types of the one or more objects using the object type candidates and the object type-specific weight values; and
    an object identifier receiving type and characteristic information of a search target object and identifying the search target object in accordance with characteristic information and the object types of the one or more objects,
    wherein the second similarity analyzer generates one or more groups from the one or more objects in accordance with similarities of position information of the one or more objects and selects one among a plurality of object type-specific weight values in consideration of positions of the one or more groups in the image.

2. The non-standard user interface object identification system according to claim 1, wherein the object candidate extractior extracts bounding rectangles of the one or more objects from the image and generates an object list comprising information regarding the bounding rectangles.

3. The non-standard user interface object identification system according to claim 2, wherein the object list comprises position information and size information of the objects.

4. The non-standard user interface object identification system according to claim 1, wherein the first similarity analyzer calculates standard UI characteristic scores of the objects and calculates similarities of the objects to standard UI types using the standard UI characteristic scores and predetermined characteristic values of the standard UI types.

5. The non-standard user interface object identification system according to claim 4, wherein the first similarity analyzer determines a standard UI type among the standard UI types, the similarity of which is equal to or greater than a threshold valve, to be an object type candidate of a corresponding object among the one or more objects.

6. The non-standard user interface object identification system according to claim 1, wherein the second similarity analyzer determines the object types of the one or more objects by applying the object type-specific weight values to the similarities of the object type candidates.

7. The non-standard user interface object identification system according to claim 1, wherein the object identifier first identifies at least one object having the same object type as the search target object, among the one or more objects, and identifies the search target object by comparing characteristic information of each of the first-identified at least one object with the characteristic information of the search target object.

8. A non-standard user interface object identification method comprising:
    extracting one or more objects from an image;
    determining object type candidates of the one or more objects in accordance with similarities between the one or more objects and a standard user interface (UI) element;
    selecting object type-specific weight values in accordance with layout characteristics of the one or more objects and determining object types of the one or more objects using the object type candidates and the object type-specific weight values; and
    receiving type and characteristic information of a search target object and identifying the search target object in accordance with characteristic information and the object types of the one or more objects,
    wherein the determination of the object types comprises generating one or more groups from the one or more objects in accordance with similarities of position information of the one or more objects and selecting one among a plurality of object type-specific weight values in consideration of positions of the one or more groups in the image.

9. The non-standard user interface object identification method according to claim 8, wherein the extraction of the one or more objects comprises extracting bounding rectangles of the one or more objects from the image and generating an object list comprising information regarding the bounding rectangles.

10. The non-standard user interface object identification method according to claim 9, wherein the determination of the object type candidates comprises position information and size information of the objects.

11. The non-standard user interface object identification method according to claim 8, wherein the determination of the object type candidates comprises calculating standard UI characteristic scores of the objects and calculating similarities of the objects to standard UI types using the standard UI characteristic scores and predetermined characteristic values of the standard UI types.

12. The non-standard user interface object identification method according to claim 11, wherein the determination of the object type candidates determines a standard UI type among the standard UI types, the similarity of which is equal to or greater than a threshold valve, to be an object type candidate of a corresponding object among the one or more objects.

13. The non-standard user interface object identification method according to claim 8, wherein the determination of the object types determines the object types of the one or more objects by applying the object type-specific weight values to the similarities of the object type candidates.

14. The non-standard user interface object identification method according to claim 8, wherein the identification of the search target object comprises first identifying at least one object having the same object type as the search target object, among the one or more objects, and identifying the search target object by comparing characteristic information of each of the first-identified at least one object with the characteristic information of the search target object.

* * * * *